US012807042B2

(12) United States Patent
Li et al.

(10) Patent No.: US 12,807,042 B2
(45) Date of Patent: Nov. 24, 2026

(54) HORIZONTAL TRANSMISSION ASSEMBLY OF SLIDE RAIL, AND FRONT ELECTRIC SLIDE RAIL OF AUTOMOBILE SEAT

(71) Applicants: KEIPER (CHANGSHU) SEATING MECHANISMS CO., LTD, Jiangsu (CN); KEIPER SEATING MECHANISMS CO., LTD., Shanghai (CN)

(72) Inventors: Jia Li, Shanghai (CN); Chuan Wang, Shanghai (CN); Yuanbo Cui, Shanghai (CN); Hongbin Ni, Shanghai (CN)

(73) Assignees: KEIPER (CHANGSHU) SEATING MECHANISMS CO., LTD, Jiangsu (CN); KEIPER SEATING MECHANISMS CO., LTD., Shanghai (CN)

( * ) Notice: Subject to any disclaimer, the term of this patent is extended or adjusted under 35 U.S.C. 154(b) by 77 days.

(21) Appl. No.: 18/995,144

(22) PCT Filed: Jul. 17, 2023

(86) PCT No.: PCT/CN2023/107666
§ 371 (c)(1),
(2) Date: Jan. 16, 2025

(87) PCT Pub. No.: WO2024/027488
PCT Pub. Date: Feb. 8, 2024

(65) Prior Publication Data

US 2026/0241837 A1 Aug. 20, 2026

(30) Foreign Application Priority Data

Aug. 5, 2022 (CN) ........................ 202222053834.1

(51) Int. Cl.
*B60N 2/06* (2006.01)
*B60N 2/07* (2006.01)

(52) U.S. Cl.
CPC ........... *B60N 2/067* (2013.01); *B60N 2/0705* (2013.01); *B60N 2/0715* (2013.01)

(58) Field of Classification Search
CPC .............................. B60N 2/067; B60N 2/0705
See application file for complete search history.

(56) References Cited

U.S. PATENT DOCUMENTS 4,118,838 A * 10/1978 Schiefer .................... F16L 3/10 248/68.1
4,899,964 A * 2/1990 Sick .................... F16B 37/0842 248/68.1

(Continued)

FOREIGN PATENT DOCUMENTS

CN 113060056 7/2021
CN 216709085 6/2022

(Continued)

OTHER PUBLICATIONS

"International Search Report (Form PCT/ISA/210) of PCT/CN2023/107666", mailed on Sep. 22, 2023, with English translation thereof, pp. 1-6.

(Continued)

*Primary Examiner* — Taylor Morris
(74) *Attorney, Agent, or Firm* — JCIPRNET

(57) ABSTRACT

The utility model provides a horizontal transmission assembly of a slide rail, and a front electric slide rail of an automobile seat. The horizontal transmission assembly is mounted in an upper rail assembly and a lower rail assembly of the slide rail; a split type retainer ring assembly and a semi-open rear bracket are mounted at a rear end of a screw rod; the split type retainer ring assembly includes a pair of mutually independent retainer rings; a convex ring extend- (Continued)

ing axially is arranged on at least one end face of each of the retainer rings; the semi-open rear bracket is provided with an elastic clamping groove with a radial opening; and a rear end of the screw end is pressed and clamped into the elastic clamping groove from the radial opening.

6 Claims, 3 Drawing Sheets

(56) References Cited

U.S. PATENT DOCUMENTS

| | | | | |
|---|---|---|---|---|
| 6,089,513 | A * | 7/2000 | Cau | F16L 3/223 248/68.1 |
| 6,715,721 | B2 * | 4/2004 | Buck | H02G 3/32 248/68.1 |
| 2009/0243327 | A1 * | 10/2009 | Koga | B60N 2/34 296/65.15 |
| 2010/0288903 | A1 * | 11/2010 | Koga | B60N 2/067 74/424.71 |
| 2013/0284875 | A1 * | 10/2013 | Enokijima | B60N 2/4249 248/429 |
| 2019/0143913 | A1 * | 5/2019 | Jones | B60N 2/914 297/217.3 |
| 2021/0339655 | A1 * | 11/2021 | Wang | B60N 2/02246 |
| 2023/0311817 | A1 * | 10/2023 | Cohrs | B60R 11/04 15/302 |
| 2023/0356631 | A1 * | 11/2023 | Kim | B60N 2/02246 |

FOREIGN PATENT DOCUMENTS

| | | | | |
|---|---|---|---|---|
| CN | 217705557 | | 11/2022 | |
| DE | 202006013423 | U1 * | 1/2008 | F16H 25/24 |
| DE | 102010001844 | A1 * | 8/2011 | F16H 55/22 |
| JP | H0484045 | | 7/1992 | |
| JP | H11129790 | | 5/1999 | |
| JP | 2007290516 | | 11/2007 | |
| JP | 2020183208 | | 11/2020 | |
| WO | WO-2009157291 | A1 * | 12/2009 | B60N 2/0705 |

OTHER PUBLICATIONS

"Written Opinion of the International Searching Authority (Form PCT/ISA/237) of PCT/CN2023/107666", mailed on Sep. 22, 2023, pp. 1-4.

* cited by examiner

HORIZONTAL TRANSMISSION ASSEMBLY OF SLIDE RAIL, AND FRONT ELECTRIC SLIDE RAIL OF AUTOMOBILE SEAT

CROSS-REFERENCE TO RELATED APPLICATION

This application is a 371 of international application of PCT application serial no. PCT/CN2023/107666, filed on Jul. 17, 2023, which claims the priority benefit of China application no. 202222053834.1, filed on Aug. 5, 2022. The entirety of each of the above mentioned patent applications is hereby incorporated by reference herein and made a part of this specification.

TECHNICAL FIELD

The utility model relates to a slide rail mechanism of an automobile seat, and in particular to a horizontal transmission assembly of a slide rail, and a front electric slide rail of an automobile seat.

BACKGROUND

CN 113060056 A (publication number) discloses a high-strength front electric slide rail. In the current high-strength front electric slide rail, pairing with a lower rail is required after a screw rod 1 is connected to an upper rail due to the design limitation. As shown in FIG. 5, the assembling process is as follows: (a) front and rear groups of retainer rings are mounted on a horizontal transmission assembly 3 (HTA); (b) a rear bracket 4 is mounted after the horizontal transmission assembly 3 is assembled on an upper rail assembly; and (c) the upper rail assembly and a lower rail assembly are assembled and connected.

Since there is a potential quality risk in the assembling process and the structure is not conducive to rework because a rear retainer ring 2 in an old state is integrated (as shown in FIG. 3) and the horizontal transmission assembly 3 and the rear retainer ring 2 cannot be separated to be pulled out, the horizontal transmission assembly 3 only can be taken out for rework after a lower rail blocking point is knocked off and the rail is disassembled, so that the working hours are prolonged, and unnecessary broken parts are easy to produce.

In addition, the rear bracket 4 in the prior art adopts a casing design (as shown in FIG. 4), and is sleeved into the screw rod 1 and then moves to a fixed position during assembling. This assembling mode is relatively complex, and the cost of each part is high.

SUMMARY

In view of the shortcomings in the prior art, the utility model provides a novel horizontal transmission assembly, and a front electric slide rail of an automobile seat. A retainer ring assembly at a rear end of a screw rod is changed into a split type design. When rework is required, a single retainer ring on a rear side can be disassembled, so that it is convenient to take out the HTA structure for rework. The specific solution is as follows:

a horizontal transmission assembly of a slide rail. The horizontal transmission assembly is mounted in an upper rail assembly and a lower rail assembly of the slide rail;

a split type retainer ring assembly and a semi-open rear bracket are arranged at the rear end of the screw rod;

the split type retainer ring assembly includes a pair of mutually independent retainer rings, and a convex ring extending axially is arranged on at least one end face of each of the retainer rings; and the semi-open rear bracket is provided with an elastic clamping groove with a radial opening, and the rear end of the screw rod is pressed and clamped in the elastic clamping groove from the radial opening.

Further, the split type retainer ring assembly is mounted at a front end of the screw rod.

Further, a pair of first retainer rings of a first split type retainer ring assembly located at the front end of the screw rod and the screw rod are riveted and fixed; and in a pair of retainer rings of a second split type retainer ring assembly at the rear end of the screw rod, a front retainer ring close to the first split type retainer ring assembly and the screw rod are riveted and fixed, and a rear retainer ring and the screw rod are in threaded fit with each other and are fixed by a thread adhesive.

Further, the convex rings are arranged on end faces of each pair of retainer rings away from each other.

Further, an axial section of the convex ring of the rear retainer ring is polygonal.

Further, each of the retainer rings has the same outer diameter of 20-25 mm.

Further, the opening of the elastic clamping groove is shaped like a slim waist with an upward opening, elastic clamping pins extending upward are arranged on two sides of the top of the elastic clamping groove, and a minimum distance between the elastic clamping pins is less than a diameter of the screw rod.

The utility model has the following advantages:

1) The retainer ring assembly at the rear end of the screw rod includes two mutually independent retainer rings. If there is a problem in the assembling of the slide rail, the rear retainer ring can be disassembled, so that the HTA structure can be taken out conveniently for rework, the working hours are saved, and the rework efficiency is improved.
2) Except for the rear retainer ring of the rear retainer ring assembly, the other retainer rings are fixedly connected to the screw rod through a pressing rivet. In addition, each pair of retainer rings are provided with convex rings extending in opposite directions, so that the stability of connection with the screw rod is enhanced, and the locking strength is improved.
3) The rear retainer ring of the rear retainer ring assembly is provided with an outer hexagon, thereby facilitating mounting and dismounting.
4) The rear end of the screw rod is fixed by the semi-open rear bracket, and the rear bracket has the elastic clamping groove with half opening. Compared with the traditional casing type rear bracket, the rear bracket is simpler to assemble, and the single-piece cost of the semi-open rear bracket is reduced.

BRIEF DESCRIPTION OF DRAWINGS

To explain the technical solutions in the embodiments of the utility model more clearly, the accompanying drawings required for describing the embodiments or the prior art will be briefly introduced. Apparently, the accompanying drawings in the following description show only some embodiments of the utility model, and other drawings can be derived from these drawings by those of ordinary skill in the art without any creative efforts.

DETAILED DESCRIPTION OF THE EMBODIMENTS

In the following description, numerous specific details are given to provide a more thorough understanding of the utility model. However, it will be apparent to those skilled in the art that the utility model may be implemented without one or more of these details. In other examples, to avoid confusion with the utility model, some technical features well known in the art are not described.

To thoroughly understand the utility model, detailed steps and detailed structures will be put forward in the following description so as to explain the technical solutions of the utility model. Preferred embodiments of the utility model are described in detail below; however, in addition to these detailed descriptions, the utility model may have other embodiments.

Figure 6:
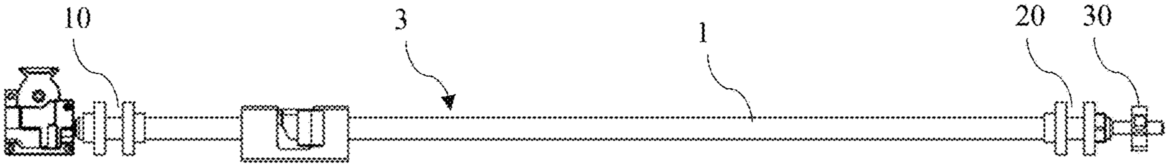
FIG. 6 is a schematic diagram of an HTA structure with a split type retainer ring assembly and a semi-open rear bracket assembled according to the utility model.
Figure 7:
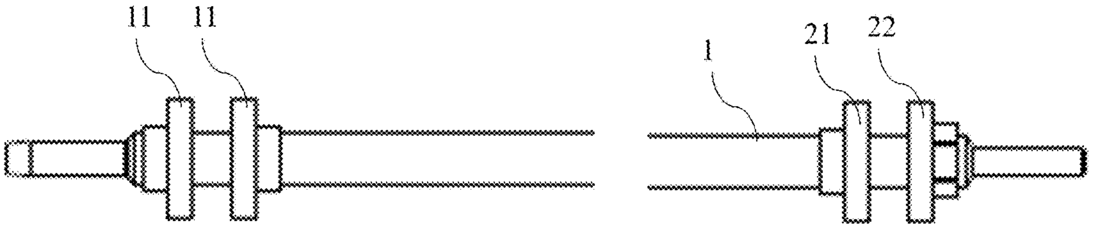
FIG. 7 is a partial structural diagram of FIG. 6.
Figure 9:
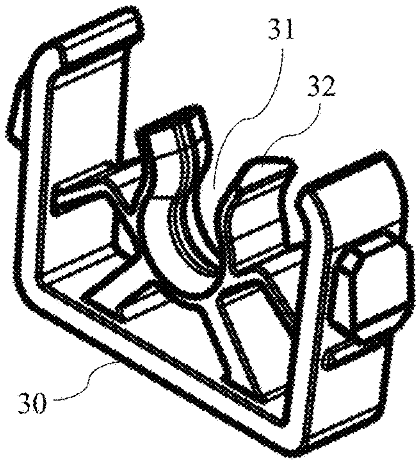
FIG. 9 is a schematic diagram of a semi-open rear bracket.

Referring to FIG. 6 to FIG. 7, the utility model provides a horizontal transmission assembly of a slide rail. The horizontal transmission assembly 3 is mounted in an upper rail assembly 5 and a lower rail assembly 6 of the slide rail; the horizontal transmission assembly 3 is provided with a screw rod 1; and a split type retainer ring assembly 10, a split type retainer ring assembly 20 and a semi-open rear bracket 30 are respectively mounted at front and rear ends of the screw rod 1. Each split type retainer ring assembly 10 and 20 includes a pair of mutually independent retainer rings; a convex ring extending axially is arranged on at least one end face of each of the retainer rings; the semi-open rear bracket 30 is provided with an elastic clamping groove 31 with a radial opening (as shown in FIG. 9); and the rear end of the screw rod 1 is pressed and clamped in the elastic clamping groove 31 from the radial opening.

Compared with the prior art in which front and rear retainer rings are all integrated, the utility model adopts the rear retainer assembly including a pair of mutually independent retainer rings, having the advantages that when there is a quality problem in the assembling and rework is required, the horizontal transmission assembly 3 can be taken out from the upper and lower rail assemblies for rework by removing the retainer ring at the back of the rear retainer ring assembly. In addition, compared with the prior art in which a casing type rear bracket is adopted, the utility model adopts the semi-open rear bracket 30 with a half opening, it is only necessary to press the screw rod 1 into the elastic clamping groove 31 to complete fixation during assembling of the rear bracket, thereby facilitating separation from the screw rod 1 and taking out the horizontal transmission assembly 3 conveniently for rework.

In an optional embodiment, a pair of first retainer rings 11 of a first split type retainer ring assembly 10 located at the front end of the screw rod 1 and the screw rod 1 are in thread fit connection and are riveted and fixed. In a pair of retainer rings of a second split type retainer ring assembly 20 located at the front end of the screw rod 1, a front retainer ring 21 close to the first split type retainer ring assembly 10 and the screw rod 1 are in thread fit connection and are riveted and fixed, and a rear retainer ring 22 and the screw rod 1 are in thread fit and are fixed by a thread adhesive. In the utility model, the rear retainer ring 22 and the screw rod 1 are fixed through adhesion, and the other retainer rings are fixed with the screw rod 1 through pressing rivets, so on one hand, the stability of connection between the retainer rings and the screw rod is ensured, and on the other hand, once the assembling problem of the slide rail assembly occurs, the rear retainer ring 22 can be taken out separately and conveniently, and then the horizontal transmission assembly 3 is taken out for rework.

Figure 1:
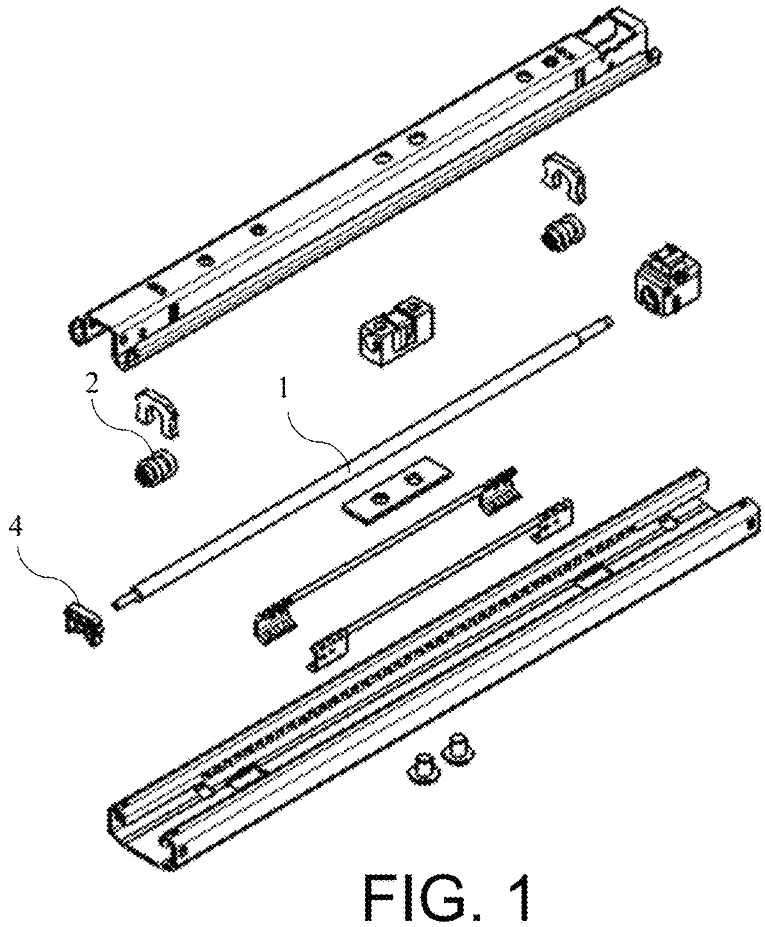
FIG. 1 is an assembling explosive view of a high-strength front electric slide rail provided in the prior art.
Figure 2:
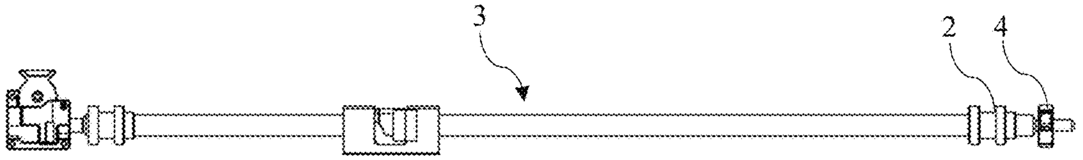
FIG. 2 is a schematic diagram of an HTA structure with front and rear retainer rings and a rear bracket assembled in the prior art.
Figure 3:
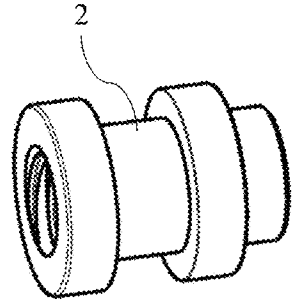
FIG. 3 is a schematic diagram of an integrated single retainer ring assembly in the prior art.
Figure 4:
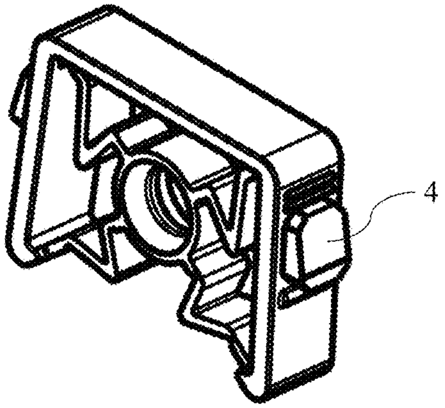
FIG. 4 is a schematic diagram of a rear bracket in the prior art.
Figure 5:
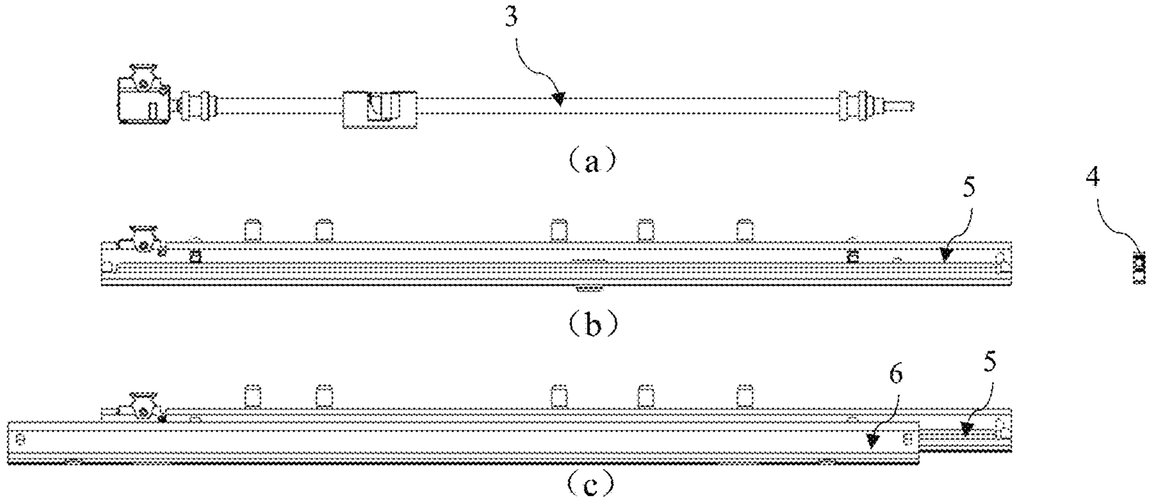
FIG. 5 is a flowchart of assembling an HTA structure on upper and lower rail assemblies in the prior art.
Figure 8:
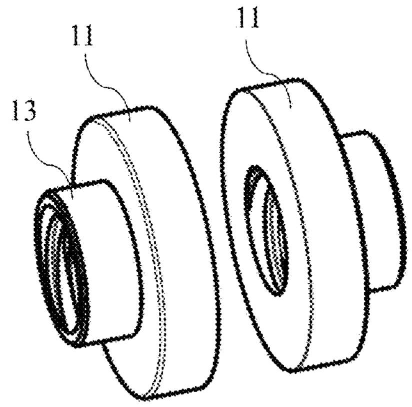
FIG. 8 is a schematic diagram of a pair of split type retainer rings of a first split type retainer ring assembly located at a front end of a screw rod.
Figure 10:
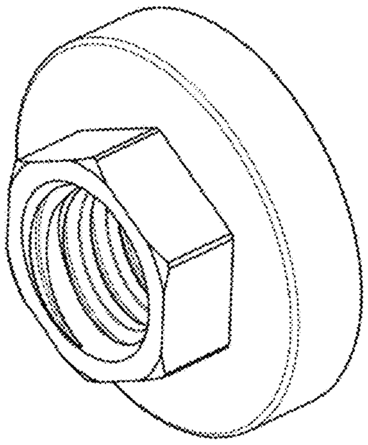
FIG. 10 is a three-dimensional diagram of a rear retainer ring with an outer hexagon convex ring structure.

According to the utility model, the convex rings are arranged on end faces, away from each other, of the pair of retainer rings of the first split type retainer ring assembly 10 and the second split type retainer ring assembly 20. As shown in FIG. 8, taking the first split type retainer ring assembly 10 as an example, convex rings 13 are arranged on opposite end faces of two retainer rings 11. Compared with the existing retainer ring assembly provided with the convex ring at only one end in FIG. 3, the utility model has higher locking strength and lower cost. To facilitate the mounting and dismounting of the rear retainer ring 22, the convex ring of the rear retainer ring 22 is set as an outer hexagon structure (as shown in FIG. 10).

In an optional embodiment, each retainer ring has the same outer diameter of 20-25 mm, and the diameter is increased compared with the existing retainer ring, so that the strength of the retainer ring is improved without affecting sliding, and the locking strength is improved.

As shown in FIG. 9, the opening of the elastic clamping groove 31 is shaped like a slim waist with an upward opening, elastic clamping pins 32 extending upward are arranged on two sides of the top of the elastic clamping groove 31, and a minimum distance between the elastic clamping pins is less than the diameter of the screw rod 1, so that it is convenient for the screw rod 1 to clamp in and pull out, and the horizontal transmission assembly 3 can be taken out more conveniently.

Figure 11:
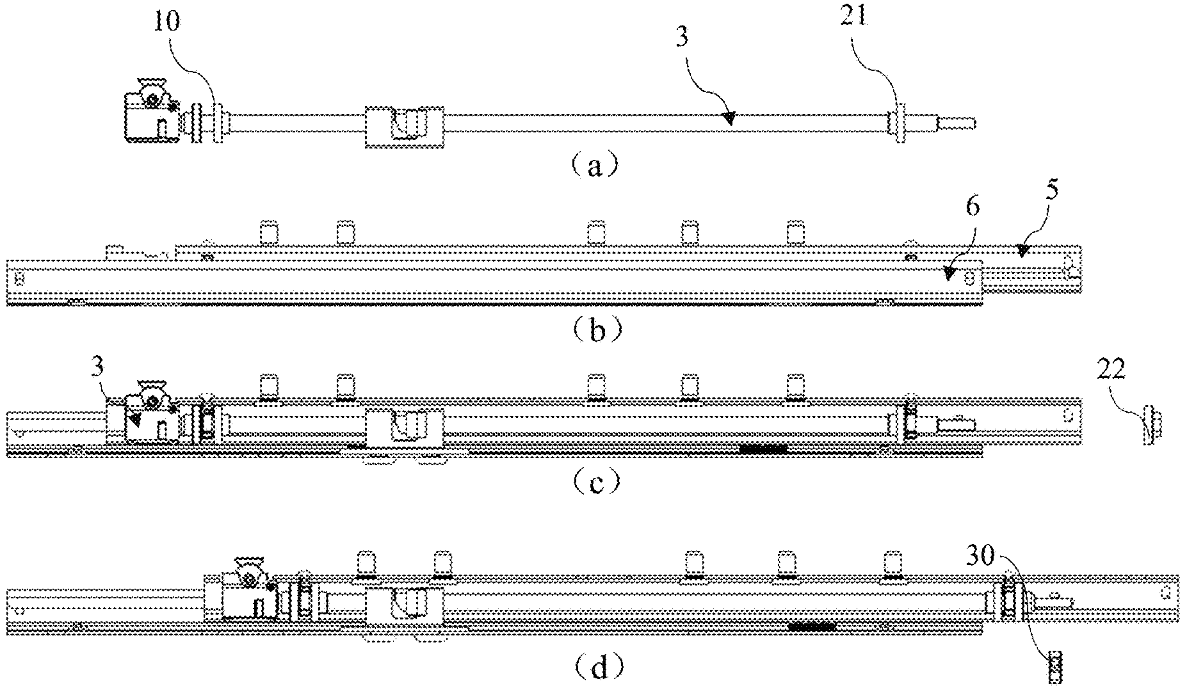
FIG. 11 is an assembling flow chart of the utility model.

As shown in FIG. 11, the assembling process of the utility model is as follows:

(a) The pair of retainer rings 11 of the first split type retainer ring assembly 10 and the front retainer ring 21 of the second split type retainer ring assembly 20 are connected to the screw rod 1 through pressing rivets, and a gearbox assembly and a nut bracket assembly are assembled on the screw rod 1 to form the horizontal transmission assembly 3.

(b) The upper rail assembly 5 and the lower rail assembly 6 are assembled together to form an upper and lower rail assembly.

(c) The horizontal transmission assembly 3 passes through the upper and lower rail assembly, and the rear retainer ring 22 is fixed at the rear end of the screw rod 1 through adhesion.

(d) The semi-open rear bracket 30 is mounted, and it is ensured that the rear end of the screw rod 1 is clamped into the elastic clamping groove 31 of the semi-open rear bracket 30.

It should be noted that the step (a) and the step (b) in FIG. 11 are in no order.

The preferred embodiments of the utility model are described above. It should be understood that the utility model is not limited to the above specific embodiments, and devices and structures that are not described in detail should be understood to be implemented in a common manner in the art; any person skilled in the art can make many possible variations and modifications to the technical solutions of the utility model, or modify them to be equivalent examples of the variations, without departing from the scope of the technical solutions of the utility model and by using the methods and technical contents disclosed above, which will not affect the essential content of the utility model. However, any simple modification, equivalent change and modification made in accordance with the technical essence of the utility model without departing from the content of the technical solution of the utility model are still within the scope of protection of the technical solutions of the utility model.

What is claimed is:

1. A horizontal transmission assembly of a slide rail, wherein the horizontal transmission assembly is arranged in an upper rail assembly and a lower rail assembly of the slide rail; the horizontal transmission assembly is provided with a screw rod;

wherein a first split type retainer ring assembly is mounted at a front end of the screw rod; and a second split type retainer ring assembly and a semi-open rear bracket are mounted at a rear end of the screw rod;

wherein each split type retainer ring assembly comprises a pair of mutually independent retainer rings, and a convex ring extending axially is arranged on at least one end face of each of the retainer rings; and the semi-open rear bracket is provided with an elastic clamping groove with a radial opening, and the rear end of the screw rod is pressed and clamped in the elastic clamping groove from the radial opening, wherein the pair of first retainer rings of the first split type retainer ring assembly located at the front end of the screw rod and the screw rod are riveted and fixed; and in the pair of retainer rings of the second split type retainer ring assembly at the rear end of the screw rod, a front retainer ring closer to the first split type retainer ring assembly and the screw rod are riveted and fixed, and a rear retainer ring and the screw rod are fixed by a thread adhesive.

2. The horizontal transmission assembly according to claim 1, wherein the convex rings are arranged on end faces of each pair of retainer rings away from each other.

3. The horizontal transmission assembly according to claim 2, wherein an axial section of the convex ring of the rear retainer ring is polygonal.

4. The horizontal transmission assembly according to claim 1, wherein each of the retainer rings has the same outer diameter of 20-25 mm.

5. The horizontal transmission assembly according to claim 1, wherein the opening of the elastic clamping groove is shaped like a slim waist with an upward opening, elastic clamping pins extending upward are arranged on two sides of the top of the elastic clamping groove, and a minimum distance between the elastic clamping pins is less than a diameter of the screw rod.

6. A front electric slide rail of an automobile seat comprising the horizontal transmission assembly according to claim 1.

* * * * *